US006035509A

United States Patent [19]

Christensen

[11] Patent Number: 6,035,509

[45] Date of Patent: Mar. 14, 2000

[54] METHOD AND APPARATUS FOR REMOVING A GASLIFT CYLINDER

[76] Inventor: Poul-Erik Christensen, 3990 W. Hidden Valley Dr., Reno, Nev. 89502

[21] Appl. No.: 09/118,146

[22] Filed: Jul. 16, 1998

Related U.S. Application Data

[60] Provisional application No. 60/053,175, Jul. 18, 1997.

[51] Int. Cl.[7] .......... B23P 19/00

[52] U.S. Cl. .......... 29/426.5; 29/426.4; 29/255; 29/270; 29/275; 248/562

[58] Field of Search .......... 29/426.5, 426.4, 29/255, 270, 275; 248/562

[56] References Cited

U.S. PATENT DOCUMENTS

| | | | |
|---|---|---|---|
| 3,788,587 | 1/1974 | Stemmler | 248/400 |
| 5,613,288 | 3/1997 | Lundsten | 29/255 |

*Primary Examiner*—P. W. Echols
*Assistant Examiner*—John C. Hong
*Attorney, Agent, or Firm*—Ian F. Burns

[57] ABSTRACT

A device for removing a gaslift from a chair comprising a guide portion that is adapted to engage a cylinder of a gaslift. The guide portion has a lower end that abuts a surface on the chair. An impact block is attached to the guide portion for receiving impact loads. An attachment device, preferably an elastic band is used to temporarily attach the device to the gaslift cylinder.

16 Claims, 3 Drawing Sheets

METHOD AND APPARATUS FOR REMOVING A GASLIFT CYLINDER

CROSS REFERENCES TO RELATED APPLICATIONS

This application claims priority of the U.S. provisional patent application Ser. No. 60/053,175 filed on Jul. 8, 1997.

BACKGROUND OF THE INVENTION

1. Field of Invention

This invention relates to a device for removing a gaslift cylinder from a chair.

2. Description of Related Art

Chairs commonly use gaslift devices for adjusting height and providing cushioning. Gaslift devices comprise a pneumatic cylinder with an air valve. Gas is trapped in the cylinder and is compressed when a person sits on the chair. The height of the chair is adjusted by adjusting the amount of air in the cylinder.

Most gaslift devices utilize a pressure or compression fitting for attaching the pneumatic cylinder to the chair. The top end of the gaslift cylinder has a conical shape that is inserted into a receptacle in the chair or in a tilt device attached to the chair. When the conical end and the receptacle are pressed together, the two objects become firmly attached.

In order to disassemble the chair, for storage, shipment, or servicing, it is often necessary or convenient to remove the gaslift device from the chair. This allows the base to be separated from the rest of the chair. However, separating the gaslift from the chair can be a difficult task because the pressure fitting does not easily disengage. It is common practice to use a hammer to strike the chair or cylinder to disengage the gaslift from the receptacle. The impact of the hammer on the chair tends to release the pressure bond between the cylinder and the receptacle. However, this method often results in damage to the chair and to the gaslift. The act of striking the chair often produces dents and chips in the chair or tilt device. Furthermore, striking the tilt device is not the most efficient method of removing the gaslift because only a small portion of the impact force is directed towards the pressure fitting.

Therefore, what has long been needed is a device that may be used to separate the gaslift from a chair. Preferably this device would not cause damage to either the chair or the gaslift. The device would also direct and focus impact forces to more efficiently disengage the pressure fitting.

SUMMARY OF INVENTION

1. Objects of the Invention

It is a primary object of the present invention to provide a gaslift removal device for conveniently removing a gaslift from a chair.

It is another object of the present invention to provide a gaslift removal device that does not damage the chair or the gaslift when the gaslift is removed from the chair.

It is a further object of the present invention to provide a gaslift removal device that is expensive to manufacturer.

It is another object of the present invention to provide a gaslift removal device that is simple and convenient to use.

It is another object of the present invention to provide a gaslift removal device that directs and focuses impact forces to more efficiently remove a gaslift from a chair.

It is yet another object of the present invention to provide a gaslift removal device that may be used with a large variety of gaslifts and chairs.

These and other objects of the present invention may be realized by reference to the remaining portions of the specification, claims, and abstract.

2. Brief Description of the Invention

In accordance with the objects of the present invention, a gaslift removal device is provided that is adapted to efficiently remove a gaslift from a chair. The device comprises a guide portion, an impact block, and an attachment device. The guide portion comprises a substantially semi-cylindrical member that is adapted to engage the cylinder of a gaslift. The impact block is attached to the guide portion by any suitable means, such as welding. The impact block has a striking surface for receiving blows from a hammer or other instrument. The impact block may also be of a shape that efficiently directs energy into the guide portion.

The attachment device of the present invention may comprise any means that attaches the gaslift device to the cylinder of the gaslift. Preferably, the attachment device comprises a cotterpin that is inserted into a hole in the impact block. The first end of the cotterpin holds an elastic band, such as an O-ring or rubberband, and the second end of the cotterpin is adapted to receive the opposite end of the elastic band.

In normal operation, a chair would first be inverted so that a user could easily strike the present invention with a downward stroke. The gaslift removal device of the present invention would then be attached to the gaslift cylinder by the attachment means. The end of the guide portion preferably rests against a surface of the knee-tilt device or chair.

The guide portion of the device engages the cylinder and provides a large surface to disperse the energy of a hammer impact. The end of the guide portion provides a surface for transmitting impact forces to the chair. Once the device is attached to the gaslift, the user would then strike the impact block with a hammer or other suitable object while exerting an upward force on the gaslift cylinder. The shock produced by the impact would be transmitted through the impact block and guide portion into the gaslift cylinder and chair. Because the striking surface of the impact block forms an obtuse angle (greater than 90°) with the side of the gaslift cylinder, the energy of the hammer blow is transmitted downward which further enhances the ability of the present invention to disengage the gaslift cylinder.

After the user strikes the gaslift removal device one or two times, the pressure fitting disengages and the gaslift cylinder may be lifted out of the receptacle of the chair. The chair may then be stored, transported, or serviced more efficiently.

The above description sets forth, rather broadly, the more important features of the present invention so that the detail description of the preferred embodiment which follows may be better understood in order that the present contributions to the art may be better appreciated. There are, of course, additional features of the invention that will be described hereinafter and which will form the subject matter of claims appended hereto. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

REFERENCE NUMERALS

Figure 1:
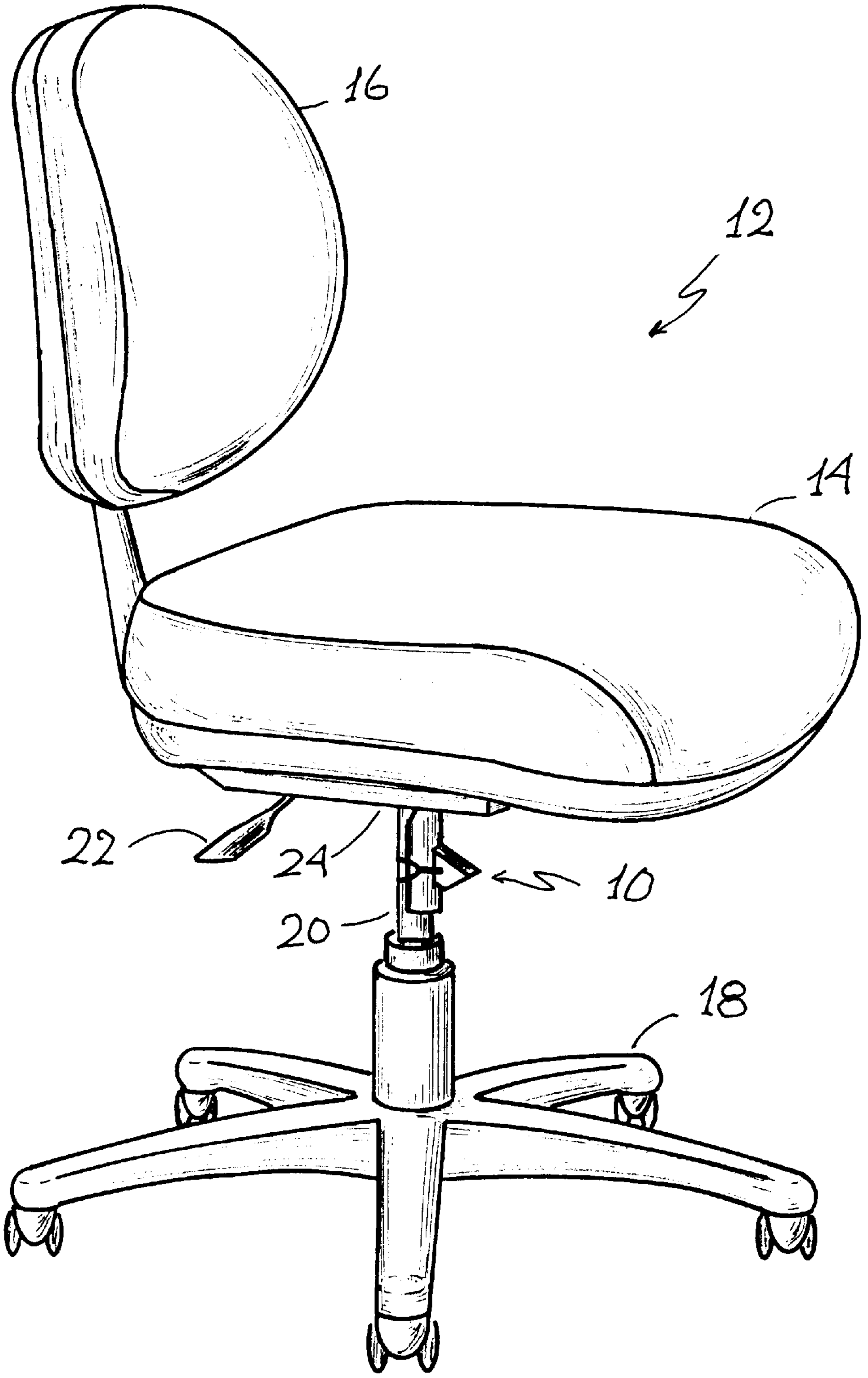
FIG. 1 is substantially a perspective view of a chair and base with the present invention attached to a gaslift cylinder.

10 gaslift removal device
12 chair
14 chair seat
16 chair back
18 base
20 gaslift cylinder
22 valve control handle
24 knee-tilt
25 lip
26 mounting surface
28 conical end
29 receptacle
30 valve stem
40 guide portion
42 impact block
44 elastic band
46 cotter pin
48 hook
50 tapered portion
52 striking surface
54 end

DESCRIPTION OF THE PREFERRED EMBODIMENT

As seen in FIG. 1, a typical chair 12 comprises a chair seat 14, a chair back 16, and a base 18. Chair base 18 is attached to seat 14 by a gaslift device. The gaslift device adjusts the hair seat 14 and provides cushioning and shock absorption when a user sits in chair 12. The gaslift device comprises a cylinder 20 that is attached to a knee-tilt device 24 or other suitable structure. A handle 22 may be used to activate a valve associated with cylinder 20 to adjust the amount of air in the gaslift device. By adjusting the amount of air in cylinder 20, a user can adjust the height of chair seat 14 and chair back 16 relative to base 18.

Figure 2:
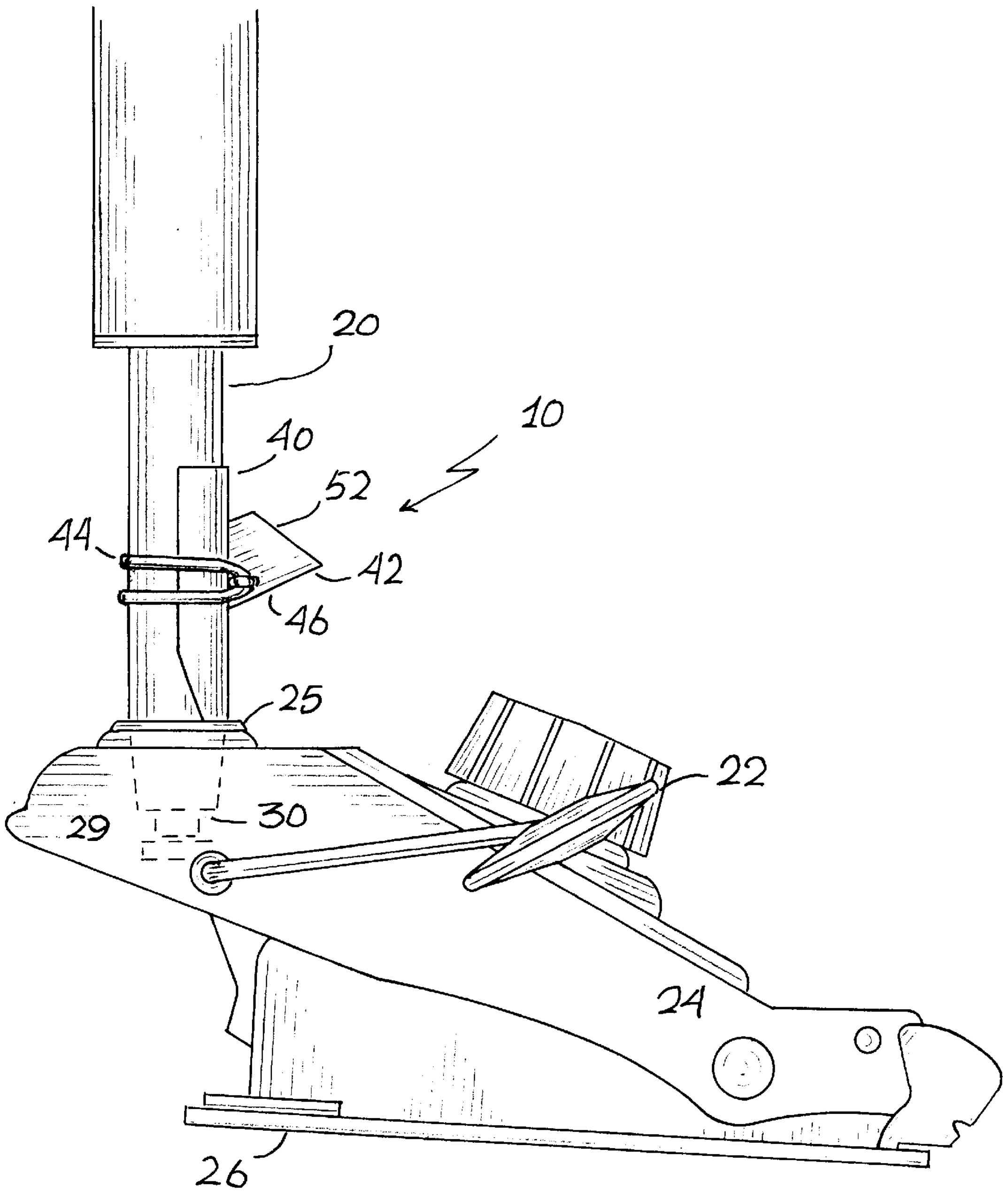
FIG. 2 is substantially a side view of an inverted gaslift device with the present invention attached to the cylinder of the gaslift.
Figure 3:
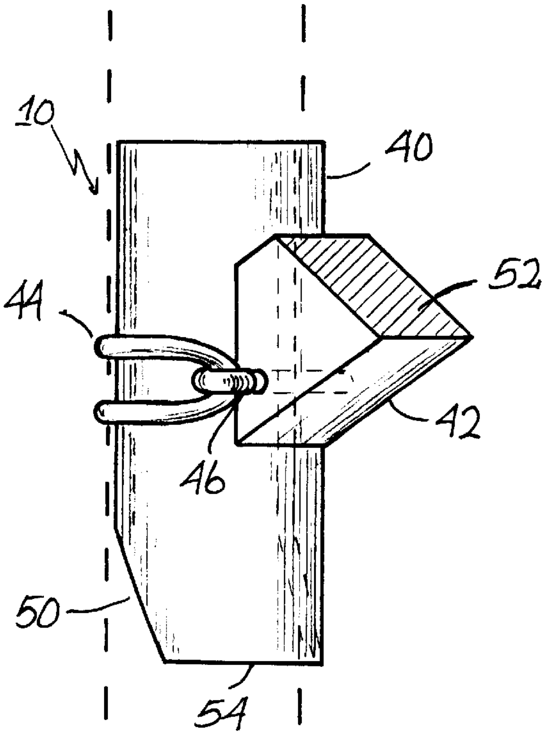
FIG. 3 is substantially a detailed perspective view of the gaslift removal device of the present invention.
Figure 4:
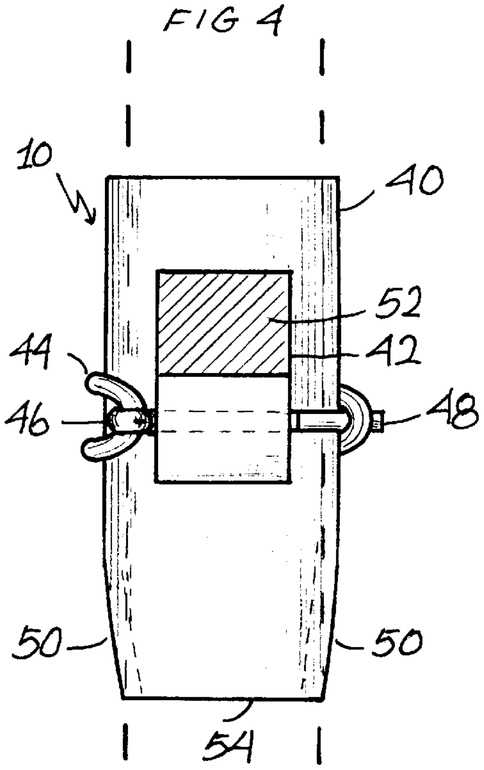
FIG. 4 is substantially a front view of a gaslift removal device of the present invention.
Figure 5:
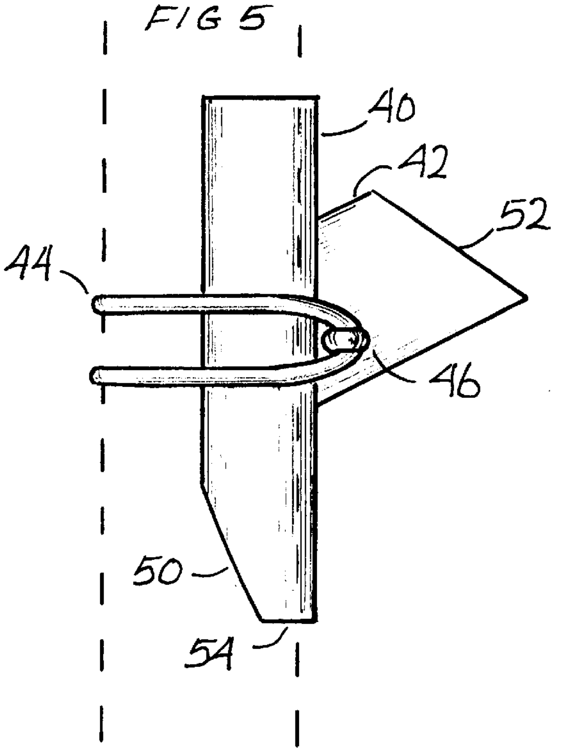
FIG. 5 is substantially a side view of a gaslift removal device of the present invention.
Figure 6:
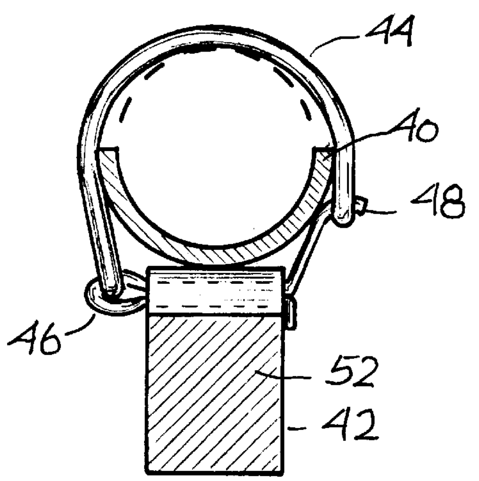
FIG. 6 is substantially a top view of the gaslift removal device of the present invention.

In FIG. 2, the gaslift device is shown in an inverted position with cylinder 20 inserted into a receptacle 29 on knee-tilt 24. Knee-tilt 24 is normally attached to a chair by mounting device 26. Cylinder 20 comprises a conical end 28 that is inserted into receptacle 29 of knee-tilt 24. Receptacle 29 has a lip 25 that defines the opening of receptacle 29. Conical end 28 and the receptacle utilize a pressure or compression fitting in which compression between the two objects holds cylinder 20 in knee-tilt device 24. A valve stem 30 is included on cylinder 20 for regulating the amount of air in cylinder 20. Handle 22 may be used to activate valve 30.

As seen in FIGS. 3–6, the gaslift removal device 10 of the present invention comprises a guide portion 40. Guide portion 40 comprises a substantially cylindrical surface for conforming to cylinder 20. The shape of guide portion 40 allows it to fit around cylinder 20 and provide a large surface area for dispersing impact forces. Guide portion 40 may also comprise tapered portions 50 for allowing device 10 to be used with certain models of chairs. Some chairs have sleeves or other obstructions that require an end 54 of guide portion 40 to have a narrower width. End 54 is preferably placed against lip 25 so that impact forces are transmitted directly to knee-tilt device 24.

Device 10 also comprises an impact block 42 for receiving hammer blows and dispersing impact forces. Impact block 42 comprises a striking surface 52 that is adapted to receive hammer blows. Striking surface 52 may form an obtuse angle with a side of cylinder 20 so that a user may conveniently and efficiently strike impact block 42 with a hammer or other object without hitting base 18. Impact block 42 is attached to guide portion 40 by any suitable attachment method, such as welding. Alternatively, impact block 42 may be integrally formed with guide portion 40.

Device 10 comprises an attachment device that holds device 10 on cylinder 20. The attachment device may be anything that efficiently attaches device 10 to cylinder 20. In the preferred embodiment of the present invention, the attachment device comprises a cotter pin 46 that is inserted into a hole in impact block 42. Cotter pin 46 holds an elastic band 44, such as an O-ring or rubberband. The elastic band 44 wraps around cylinder 20 and is removably attached to a hook 48 of cotter pin 46. Other types of attachment devices may also be used, such as cords or adhesive tape.

Device 10 may be made of any suitable material of choice, such as impact resistant plastic, metal, or wood. Preferably, however, device 10 is steel with a powder coat finish. The powder finish helps protect device 10 and prevent corrosion.

In normal operation, a user who wishes to remove a gaslift device from a chair would first invert the chair so that the user can efficiently access the gaslift. User would then attach device 10 to cylinder 20 by first seating guide portion 40 on cylinder 20. Lower portion 54 would be positioned to rest against lip 25. Elastic band 44 is wrapped around cylinder 20 and attached to hook 48. The user may then use a hammer or other instrument to strike striking surface 52 of impact block 42. The impact forces of the hammer striking impact block 42 are transmitted into guide portion 40. Guide portion 40 transmits the impact forces into cylinder 20 and lip 25 of knee-tilt 24. The impact forces tend to disturb and loosen cylinder 20 from knee-tilt 24.

SUMMARY

It may now be seen that the present invention provides a novel device for removing a gaslift from a chair. The device is simple and efficient to use, inexpensive to manufacturer, and durable. Furthermore, the device may be used on a large variety of chairs and gaslift devices.

Although the description above contains many specifications, these should not be construed as limiting the scope of the invention but as merely providing illustrations of some of presently preferred embodiments of this invention. For example, the size and shape of impact block 42 may be changed and still achieve the objects of the present invention. Thus, the scope of the invention should be determined by the appended claims and their legal equivalents rather than by the examples given.

What is claimed is:

1. A gaslift removal device for removing a gaslift cylinder from a receptacle on a chair, comprising:

(A) a guide portion, said guide portion having a surface adapted to abut an outer surface of the gaslift cylinder;

(B) an impact block attached to said guide portion, said impact block having a surface adapted to receive a blow from an object, wherein impact force is transmitted to said guide portion and said guide portion transmits impact forces to the gaslift cylinder; and (C) an attachment device attached to said guide portion, said attachment device being adapted to attach said gaslift removal device to the cylinder.

2. The gaslift removal device of claim 1 wherein said guide portion comprises a substantially cylindrical surface.

3. The gaslift removal device of claim 1 wherein said guide portion comprises a tapered portion.

4. The gaslift removal device of claim 1 wherein said attachment device comprises an elastic band.

5. The gaslift removal device of claim 4 wherein said elastic band is attached to the gaslift removal device with a cotter pin.

6. The gaslift removal device of claim 5 wherein said cotter pin is inserted through a hole in said impact block.

7. The gaslift removal device of claim 1 wherein said impact block comprises a striking surface.

8. The gaslift removal device of claim 7 wherein said striking surface forms an obtuse angle with a side of the gaslift cylinder.

9. A method of removing a gaslift cylinder from a chair comprising the following steps:

(A) providing a gaslift removal device, the removal device comprising a guide portion, an impact block attached to the guide portion, and an attachment device attached to the guide portion;

(B) placing the gaslift removal device on the cylinder, wherein the guide portion abuts a side of the cylinder;

(C) attaching the gaslift removal device to the cylinder using the attachment device;

(D) striking the impact block with an object; and (E) removing the gaslift cylinder from the chair.

10. The method of claim 9 wherein the guide portion of the gaslift removal device comprises a cylindrical surface, and the step of placing the gaslift removal device on the cylinder comprises placing the cylindrical surface on the side of the cylinder.

11. The method of claim 10 wherein the attachment device comprises an elastic band, and the step of attaching the gaslift removal device to the cylinder comprises placing the elastic band around the cylinder and fastening the elastic band to the gaslift removal device.

12. The method of claim 11 wherein the attachment device comprises a hook, the step of attaching the gaslift removal device to the cylinder comprises hooking the elastic band on the hook.

13. A device for removing a gaslift cylinder from a chair, comprising:

(A) means for receiving an impact from an object;

(B) means for abutting a side of the cylinder and transmitting impact forces to the cylinder; and (C) means for removably attaching the device to the cylinder.

14. The device of claim 13 wherein said means for abutting a side of the cylinder comprises a substantially cylindrical surface.

15. The device of claim 13 wherein said means for removably attaching the device to the cylinder comprises an elastic band.

16. The device of claim 15 wherein said means for removably attaching the device to the cylinder comprises means for holding said elastic band.

* * * * *